(12) United States Patent
Aoki et al.

(10) Patent No.: US 9,974,121 B2
(45) Date of Patent: May 15, 2018

(54) RADIO FREQUENCY HEATING APPARATUS

(75) Inventors: Yasuchika Aoki, Nara (JP); Hiroshi Sumi, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1882 days.

(21) Appl. No.: 13/386,269

(22) PCT Filed: Sep. 2, 2010

(86) PCT No.: PCT/JP2010/005400
§ 371 (c)(1),
(2), (4) Date: Jan. 20, 2012

(87) PCT Pub. No.: WO2011/030524
PCT Pub. Date: Mar. 17, 2011

(65) Prior Publication Data
US 2012/0125917 A1    May 24, 2012

(30) Foreign Application Priority Data
Sep. 10, 2009    (JP) ................................ 2009-208898

(51) Int. Cl.
*H05B 6/12* (2006.01)
*H05B 6/66* (2006.01)
*H05B 6/68* (2006.01)

(52) U.S. Cl.
CPC ............. *H05B 6/666* (2013.01); *H05B 6/685* (2013.01); *Y02B 40/143* (2013.01)

(58) Field of Classification Search
CPC . H05B 6/04; H05B 6/06; H05B 6/686; H05B 6/66; H05B 6/687; H05B 6/702
(Continued)

(56) References Cited

U.S. PATENT DOCUMENTS 2,498,760 A * 2/1950 Kreithen .................... 331/40
2,545,997 A * 3/1951 Hagopian .................. 331/168
(Continued)

FOREIGN PATENT DOCUMENTS

JP          63-4590 A      1/1988
JP          63-284791 A    11/1988
(Continued)

OTHER PUBLICATIONS

Supplementary European Search Report in corresponding European Application No. 10 81 5125, dated Oct. 25, 2013, 4 pages.
(Continued)

*Primary Examiner* — Eric Stapleton
(74) *Attorney, Agent, or Firm* — Brinks Gilson & Lione

(57) ABSTRACT

A radio frequency heating apparatus includes a printed circuit board on which power-supply noise filter circuit (20) that reduces power-supply noise generated by magnetron (15) and power-supply synchronization detecting circuit (21) that is connected across both terminals of power supply for detecting information on power-supply frequency are mounted. Power-supply synchronization detecting circuit (21) is used as a discharge path for charge accumulated at both ends of capacitor (3) configuring power-supply noise filter circuit (20). This achieves the radio frequency heating apparatus that eliminates the risk of electric shock, reduces power consumption, and reduces the number of components.

3 Claims, 4 Drawing Sheets

(58) Field of Classification Search
USPC ........ 219/620, 660, 695–697, 702, 715–718, 219/745–750, 756, 758, 761, 762
See application file for complete search history.

(56) References Cited

U.S. PATENT DOCUMENTS

| | | | |
|---|---|---|---|
| 2,546,500 A * | 3/1951 | Hall | 361/88 |
| 2,558,100 A * | 6/1951 | Rambo | 331/11 |
| 2,991,430 A * | 7/1961 | Allred et al. | 331/183 |
| 3,731,201 A * | 5/1973 | Frisbie | 455/91 |
| 3,783,366 A * | 1/1974 | Cox | 363/3 |
| 3,816,690 A * | 6/1974 | Mittelmann | 219/663 |
| 3,895,295 A * | 7/1975 | Mittelmann | 324/142 |
| 3,909,598 A * | 9/1975 | Collins et al. | 702/30 |
| 4,017,701 A * | 4/1977 | Mittelmann | 219/618 |
| 4,187,405 A * | 2/1980 | Puschner et al. | 219/691 |
| 4,438,500 A * | 3/1984 | Collins et al. | 702/30 |
| 4,457,632 A * | 7/1984 | Collins et al. | 374/14 |
| 4,467,164 A * | 8/1984 | Nakata et al. | 219/703 |
| 4,769,519 A * | 9/1988 | Hall | 219/667 |
| RE32,861 E * | 2/1989 | Collins et al. | 702/30 |
| 4,868,357 A * | 9/1989 | Serikawa et al. | 219/706 |
| 4,931,609 A * | 6/1990 | Aoki | 219/716 |
| 4,988,922 A * | 1/1991 | Shoda et al. | 315/223 |
| 5,012,058 A * | 4/1991 | Smith | 219/716 |
| 5,053,682 A * | 10/1991 | Shoda et al. | 315/223 |
| 5,115,168 A * | 5/1992 | Shoda et al. | 315/223 |
| 5,124,518 A * | 6/1992 | Lee | 219/718 |
| 5,171,949 A * | 12/1992 | Fujishima et al. | 219/716 |
| 5,268,547 A * | 12/1993 | Bessyo et al. | 219/716 |
| 5,349,166 A * | 9/1994 | Taylor | 219/643 |
| 5,354,972 A * | 10/1994 | Han | 219/715 |
| 5,423,260 A * | 6/1995 | Goldberg et al. | 101/424.1 |
| 5,536,921 A * | 7/1996 | Hedrick et al. | 219/693 |
| 5,565,781 A * | 10/1996 | Dauge | 324/403 |
| 5,571,439 A * | 11/1996 | Daley et al. | 219/716 |
| 5,616,269 A * | 4/1997 | Fowler et al. | 219/720 |
| 5,653,906 A * | 8/1997 | Fowler et al. | 219/716 |
| 5,908,574 A * | 6/1999 | Keogh | 219/622 |
| 5,909,086 A * | 6/1999 | Kim et al. | 315/111.21 |
| 5,977,530 A * | 11/1999 | Bessho et al. | 219/715 |
| 6,255,635 B1 * | 7/2001 | Thompson et al. | 219/663 |
| 6,433,321 B1 * | 8/2002 | Lee et al. | 219/715 |
| 6,441,354 B1 * | 8/2002 | Seghatol et al. | 219/679 |
| 6,624,579 B2 * | 9/2003 | Yasui et al. | 315/39.51 |
| 6,677,717 B2 * | 1/2004 | Park | 315/248 |
| 6,693,266 B1 * | 2/2004 | Yagi | 219/695 |
| 6,744,209 B2 * | 6/2004 | Jang et al. | 315/39.51 |
| 6,856,095 B2 * | 2/2005 | Zeng et al. | 315/70 |
| 7,034,267 B2 * | 4/2006 | Kim et al. | 219/715 |
| 7,208,710 B2 * | 4/2007 | Gregoire et al. | 219/697 |
| 7,282,682 B2 * | 10/2007 | Suenaga et al. | 219/715 |
| D565,888 S * | 4/2008 | Frank Tim | D7/351 |
| 8,213,189 B2 * | 7/2012 | Nishikawa | 363/21.02 |
| 2002/0074953 A1 * | 6/2002 | Lovell et al. | 315/248 |
| 2002/0088799 A1 * | 7/2002 | Behnke et al. | 219/679 |
| 2002/0179597 A1 * | 12/2002 | Kitaizumi et al. | 219/715 |
| 2003/0013034 A1 * | 1/2003 | Behnke et al. | 430/124 |
| 2004/0206755 A1 * | 10/2004 | Hadinger | 219/761 |
| 2005/0249667 A1 * | 11/2005 | Tuszynski et al. | 424/9.3 |
| 2006/0289528 A1 * | 12/2006 | Chiu et al. | 219/748 |
| 2007/0079718 A1 * | 4/2007 | Behnke et al. | 101/487 |
| 2007/0095823 A1 * | 5/2007 | Sedlmayr | 219/688 |
| 2010/0176121 A1 * | 7/2010 | Nobue et al. | 219/716 |

FOREIGN PATENT DOCUMENTS

| | | |
|---|---|---|
| JP | 03-001480 A | 1/1991 |
| JP | 5-121161 A | 5/1993 |
| JP | 06-029084 A | 2/1994 |
| JP | 8-64358 A | 3/1996 |
| JP | 2001-258727 A | 9/2001 |
| JP | 2002-110337 A | 4/2002 |
| JP | 2004-055312 A | 2/2004 |
| JP | 2005-050721 A | 2/2005 |
| JP | 2005-110472 A | 4/2005 |
| JP | 2006-134628 A | 5/2006 |

OTHER PUBLICATIONS

International Search Report for International Application No. PCT/JP2010/005400, dated Dec. 14, 2010, 2 pages.

* cited by examiner

RADIO FREQUENCY HEATING APPARATUS

TECHNICAL FIELD

The present invention relates to radio frequency heating apparatuses.

BACKGROUND ART

FIG. 4 is a circuit diagram of a conventional radio frequency heating apparatus. In this type of conventional radio frequency heating apparatus, commercial power supply is connected to high-voltage power supply 101 for controlling power and magnetron 102 for heating food via power plug 98 and power-supply noise filter circuit 109. Current fuse 103 for blocking current at the time of overcurrent is attached to power noise filter circuit 109.

In this type of conventional radio frequency heating apparatus, low-voltage transformer 105 for supplying predetermined voltage from commercial power supply via power plug 98 is connected to control circuit 104 for controlling the radio frequency heating apparatus. Temperature fuse 106 is inserted into low-voltage transformer 105 in order to prevent layer short that occurs by abnormal heat, typically generated by short-circuiting failure at the secondary output of low-voltage transformer 105.

Power-supply synchronization detecting circuit 107 is provided on one of secondary outputs of low-voltage transformer 105. Power-supply synchronization detecting circuit 107 obtains information on power supply phase and information on commercial frequency required for controlling the radio frequency heating apparatus by detecting power-supply frequency of commercial power supply input from power plug 98 via winding of low-voltage transformer 105. Microcomputer 99 configuring control circuit 104 uses these pieces of information for time measurement and for controlling input phase typically of relay 100. By controlling input phase of relay 100, wear of a contact of relay 100 can be minimized.

Temperature switch 108 is attached to one of power supply lines to low-voltage transformer 105. Temperature switch 108 is attached so as to detect abnormal heat generation from electric components in the radio frequency heating apparatus, and stop the operation. In FIG. 4, when temperature switch 108 is operated, power supply to low-voltage transformer 105 is blocked, and the operation of apparatus is stopped by stopping the operation of control circuit 104.

A radio frequency generator generates noise from high-voltage power supply 101 or magnetron 102 when it generates radio frequency, and this noise is transmitted to power plug 98 through internal wiring. As a result, the noise is transmitted to other electric appliance connected to the same receptacle via power plug 98. Therefore, if other electric appliance includes a microcomputer, the noise of radio frequency heating apparatus causes erroneous operation. This may reset other electric appliance, and stops power distribution. In the worst case, the power cannot be turned off due to runaway of microcomputer program. To reduce the influence of noise generated from high-voltage power supply 101 or magnetron 102 on other electric appliances, power-supply noise filter circuit 109 is provided.

Power supply noise filter circuit 109 reduces noise generated from high-voltage power supply 101 and magnetron 102 when the radio frequency heating apparatus generates radio frequency. Power-supply noise filter circuit 109 includes three types of electric components: Common-mode choke coil 120 for reducing low-band common noise, across-the-line capacitor 121 for reducing low-band normal mode noise, and line-to-ground capacitor 122 for reducing noise in both high-band common and normal modes. (For example, see PTL 1.)

In the case of the radio frequency heating apparatus in FIG. 4, charge accumulated at both ends of across-the-line capacitor 121 is discharged via primary winding of low-voltage transformer 105. Therefore, voltage between terminals of power plug 98 immediately drops if the user pulls out power plug 98, preventing electric shock.

However, if temperature fuse 106 built in low-voltage transformer 105 activates at failure of the radio frequency heating apparatus for some reason and is blocked off, a discharge path of across-the-line capacitor 121 is cut. Therefore, voltage at both terminals of power plug 98 remains, leaving the risk of electric shock at repair service.

In the same way, if temperature switch 108 is operated and temperature switch 108 is opened, the discharge path of across-the-line capacitor 121 is cut. Voltage at both terminals of power plug 98 thus remains, leaving the risk of electric shock. In addition, the same risk remains if wiring connecting power supply noise filter circuit 109 and temperature switch 108 or low-voltage transformer 105 is disconnected for some reason.

To reduce this risk, discharge resistor 124 is generally inserted in power supply noise filter circuit 109.

On the other hand, development of equipment friendly to global environment has been demanded, and legislation related to power consumption has been encouraged, in particular, with respect to daily-use electric home appliances. Standby power during non-operation is said to be 10% to 20% of total power consumption, and this is gaining attention. With consideration to the practical use state of radio frequency heating apparatuses, a power supply system for control circuit has been increasingly switched from low-voltage transformer to switching power supply. This is to reduce power consumption during non-operation time, i.e., standby time, rather than that during actual cooking time when radio frequency heating and heater are used.

FIG. 5 is a circuit diagram of a radio frequency heating apparatus using switching power supply. The circuit diagram of the radio frequency heating apparatus shown in FIG. 5 further reduces power consumption by minimizing load of control circuit when the apparatus is not needed. (For example, see PTL 2.) In FIG. 5, commercial power supply input from power plug 98 is connected to high-voltage power supply 101 for controlling power and magnetron 102 for heating food via power-supply noise filter circuit 123. Current fuse 103 for blocking current at the time of overcurrent is attached to power-supply noise filter circuit 123.

Unlike that in FIG. 4, switching power supply 125 is connected to power-supply noise filter circuit 123 in the radio frequency heating apparatus in FIG. 5. Output of switching power supply 125 controls input phase of relay 100. In the case of switching power supply 125, commercial power supply once smoothed by diode 127 and capacitor 128 is converted to power by a switching element and transformer. Accordingly, information on commercial frequency at the secondary side of low-voltage transformer 105 cannot be detected, unlike low-voltage transformer 105 in FIG. 4. Therefore, information required for controlling power-supply phase or radio frequency heating apparatus at commercial frequency is detected by providing power-supply synchronization detecting circuit 126 adopting a system including a photo coupler.

Even in the case of radio frequency heating apparatus using this switching power supply 125, temperature switch 108 is attached to one of supply lines of switching power supply 125. Accordingly, also in the radio frequency heating apparatus shown in FIG. 5, discharge resistor 124 inserted into power-supply noise filter circuit 123 secures the discharge path of across-the-line capacitor 121 even if temperature switch 108 is operated and becomes open. Voltage thus does not remain at both terminals of power plug 98, eliminating the risk of electric shock. This is the same when wiring that connects power-supply noise filter circuit 123, temperature switch 108, and switching power supply 125 is disconnected for some reason.

The radio frequency heating apparatuses shown in FIGS. 4 and 5 consume power in low-voltage transformer 105 that is power source for control circuit 104, switching power supply 125, or power-supply synchronization detecting circuits 107 and 126. Furthermore, discharge resistor 124 that also functions as a discharge circuit during normal use is needed in order to suppress voltage remaining in terminals of power plug 98 even if temperature switch 108 attached as a safety device or temperature fuse 106 built in low-voltage transformer 105 is operated in the radio frequency heating apparatuses in FIGS. 4 and 5. Accordingly, further extra power is consumed.

PTL 1 Japanese Patent No. 2864879
PTL 2 Japanese Patent No. 3397197

SUMMARY OF THE INVENTION

The present invention offers a radio frequency heating apparatus that is safe during normal use and at the time of repair service for an assumed failure state, and reduces unnecessary power consumption in the apparatus. In addition, the present invention offers the radio frequency heating apparatus that has less number of components, and thus cuts back unnecessary cost.

The present invention includes a heating chamber for placing a cooking target, a radio frequency generator for generating radio frequency in the heating chamber, a power-supply noise filter circuit for reducing power-supply noise generated by the radio frequency generator, power-supply synchronization detecting circuit connected across both terminals of power supply for detecting information on power-supply frequency, and a printed circuit board on which the power-supply noise filter circuit and power-supply synchronization detecting circuit are mounted. The present invention employs the power-supply synchronization detecting circuit as a discharge path for charge accumulated at both ends of a capacitor configuring the power-supply noise filter circuit.

With this configuration, the power-supply synchronization detecting circuit is used for discharging the charge accumulated at both ends of the capacitor configuring the power-supply noise filter circuit. Accordingly, the need of a dedicated discharge resistor is eliminated. In other words, the number of components is reduced, enabling cutting back on unnecessary cost. In addition, by placing the power-supply noise filter circuit and the power-supply synchronization detecting circuit on the same board, the discharge path of the capacitor is secured even if internal wiring is detached or disconnected, and a temperature fuse or a temperature switch is operated. Accordingly, this configuration ensures safety at the same time.

The present invention thus enables elimination of the discharge resistor of capacitor disposed between lines for suppressing noise and also suppression of power consumption while securing safety during servicing.

DETAILED DESCRIPTION OF THE PREFERRED EMBODIMENTS

An exemplary embodiment of the present invention is described below with reference to drawings. However, the scope of the present invention is not limited to this exemplary embodiment.

Exemplary Embodiment

Figure 1:
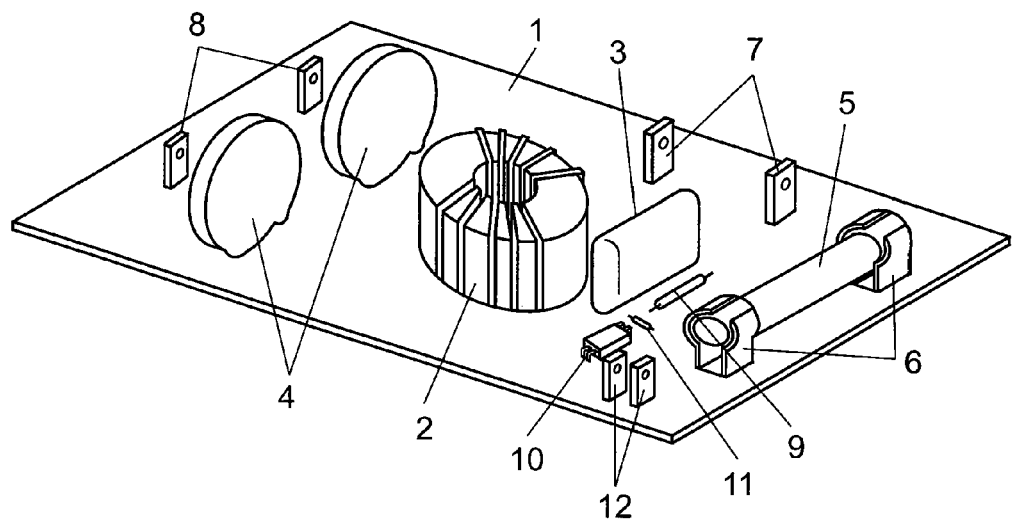
FIG. 1 is a perspective view of a printed circuit board of a radio frequency heating apparatus in accordance with an exemplary embodiment of the present invention.
Figure 2:
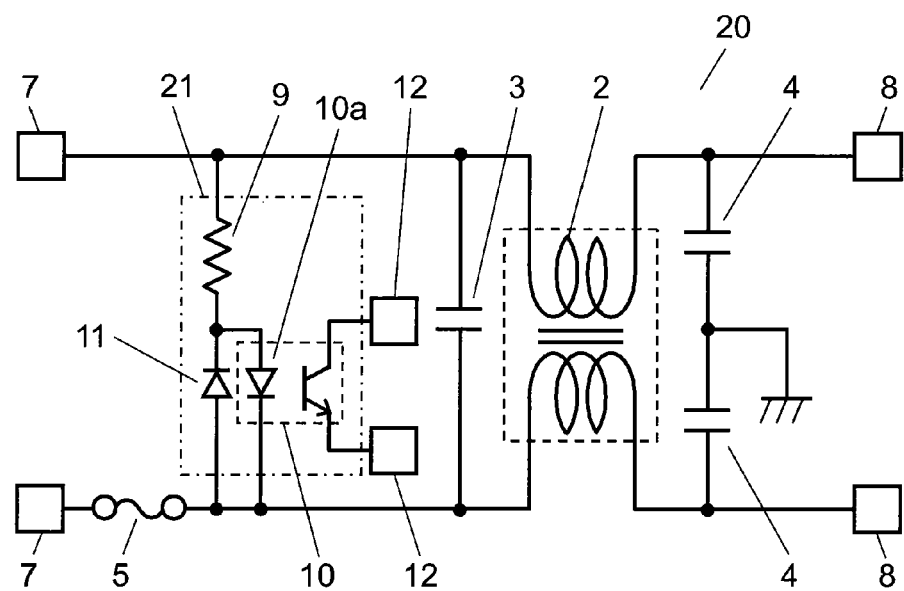
FIG. 2 is a circuit diagram of the printed circuit board in accordance with the exemplary embodiment of the present invention.

FIG. 1 is a perspective view of a printed circuit board on which a power-supply noise filter circuit of a radio frequency heating apparatus in the exemplary embodiment of the present invention is mounted. FIG. 2 is a circuit diagram of the printed circuit board in the exemplary embodiment.

As shown in FIGS. 1 and 2, three types of electric components that configure power-supply noise filter circuit 20 are mounted on printed circuit board 1. They are common-mode choke coil 2, across-the-line capacitor 3, and line-to-ground capacitor 4. In general, noise generated by the radio frequency heating apparatus includes a normal mode that propagates between lines, and a common mode that propagates between both lines and grounding. Common-mode choke coil 2 reduces a low-band common noise. Across-the-line capacitor 3 reduces low-band normal mode noise. Line-to-ground capacitor 4 reduces noise in both high-band common and normal modes. In this way, power-supply noise filter circuit 20 reduces power-supply noise generated by a magnetron, which is a radio frequency generator, by making the power-supply noise pass through power-supply noise filter circuit 20. This includes removal of power-supply noise.

Fuse holder clip 6 to which current fuse 5 configuring power-supply noise filter 20 is set is also mounted on printed circuit board 1. Still more, tab terminal 7 connecting a power supply line for supplying power from commercial power supply and an input side of printed wiring of printed circuit board 1 is mounted on printed circuit board 1. Tab terminal 8 connecting an output side of the printed circuit of printed circuit board 1, a control circuit of the radio frequency heating apparatus, and the radio frequency generator is also mounted on printed circuit board 1. Furthermore, resistor 9 configuring power-supply synchronization detecting circuit 21, photo coupler 10, diode 11 for protecting a terminal of light-emitting element 10a of photo coupler 10, and tab terminal 12 for connecting an output signal of power-supply synchronization detecting circuit 10 to the control circuit are mounted on printed circuit board 1. These components mounted on printed circuit board 1 are soldered onto printed wiring on a rear face of printed circuit board 1, and they are electrically connected by the printed wiring.

In this exemplary embodiment, power-supply noise filter circuit 20 and power-supply synchronization detecting circuit 21 are mounted on the same printed circuit board. As described later, power-supply synchronization detecting circuit 21 is employed as a discharge path for charge accumulated at both ends of across-the-line capacitor 3 configuring power-supply noise filter circuit 20.

Figure 3:
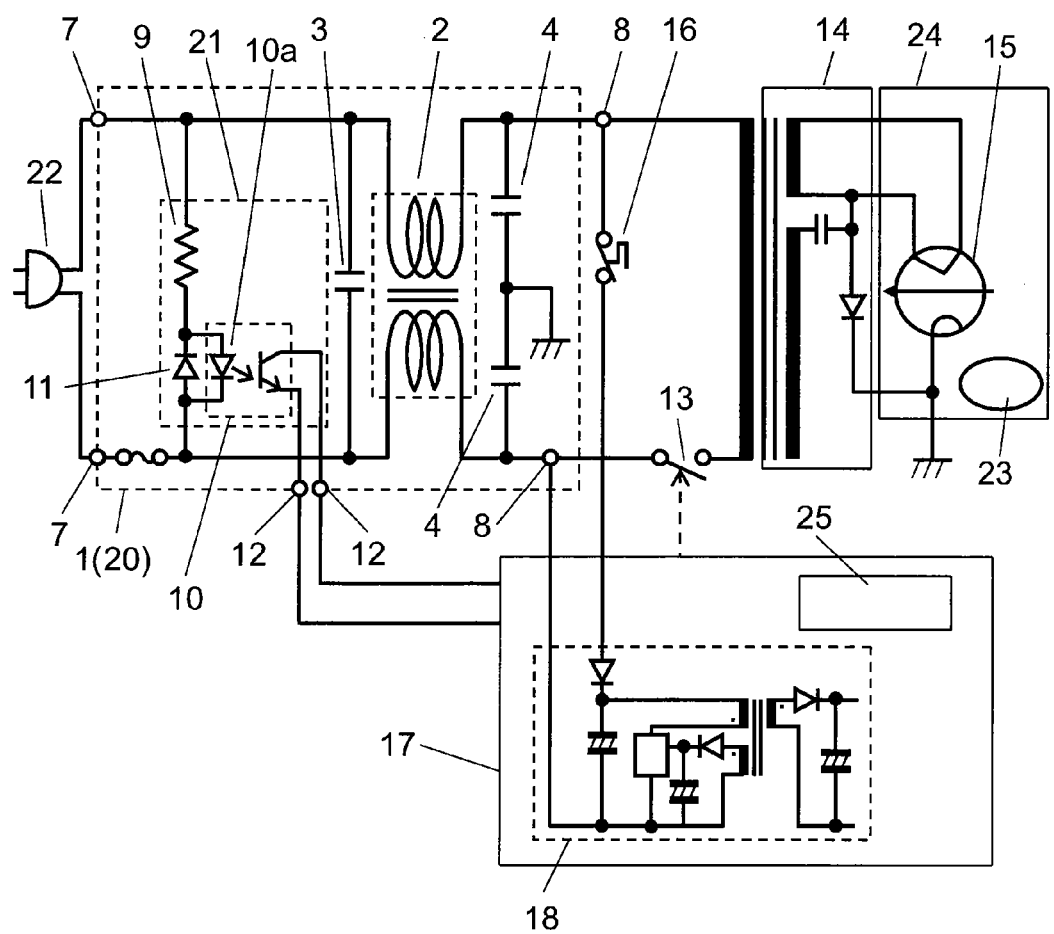
FIG. 3 is a circuit diagram of the entire radio frequency heating apparatus in accordance with the exemplary embodiment of the present invention.
Figure 4:
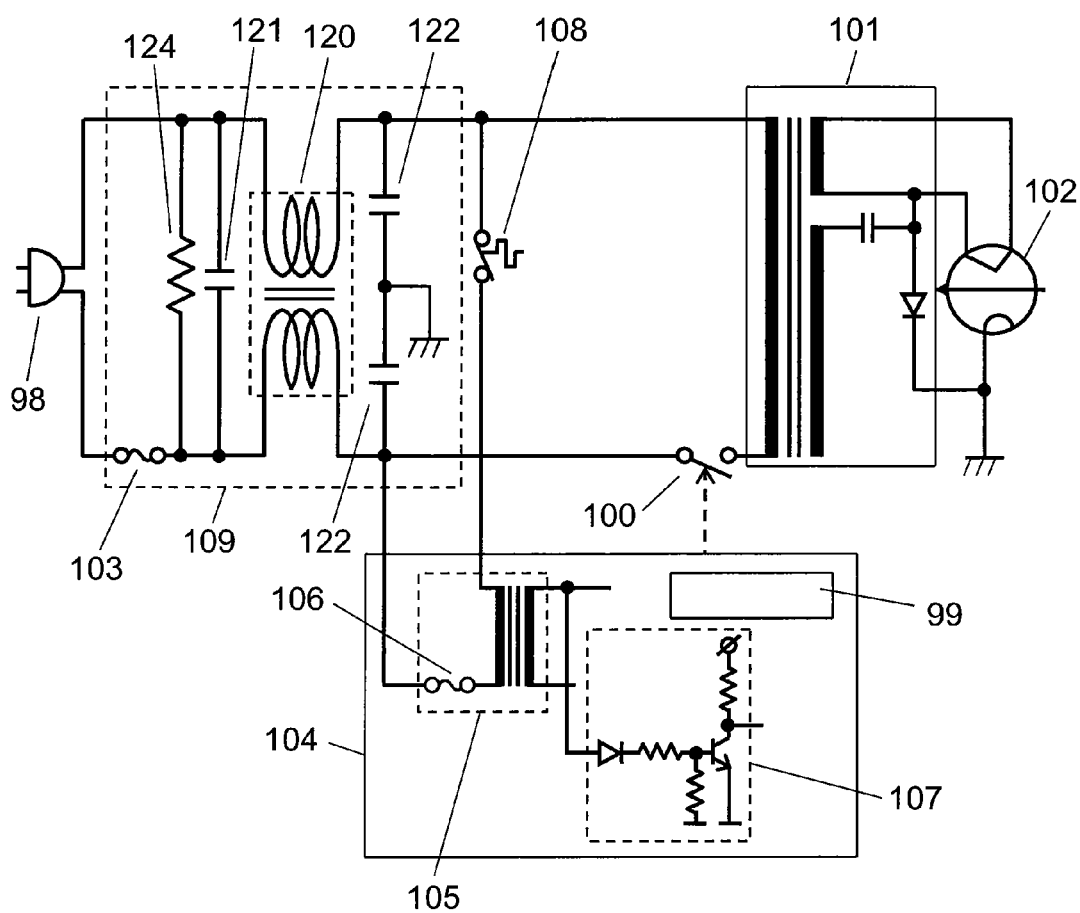
FIG. 4 is a circuit diagram of a conventional radio frequency heating apparatus.
Figure 5:
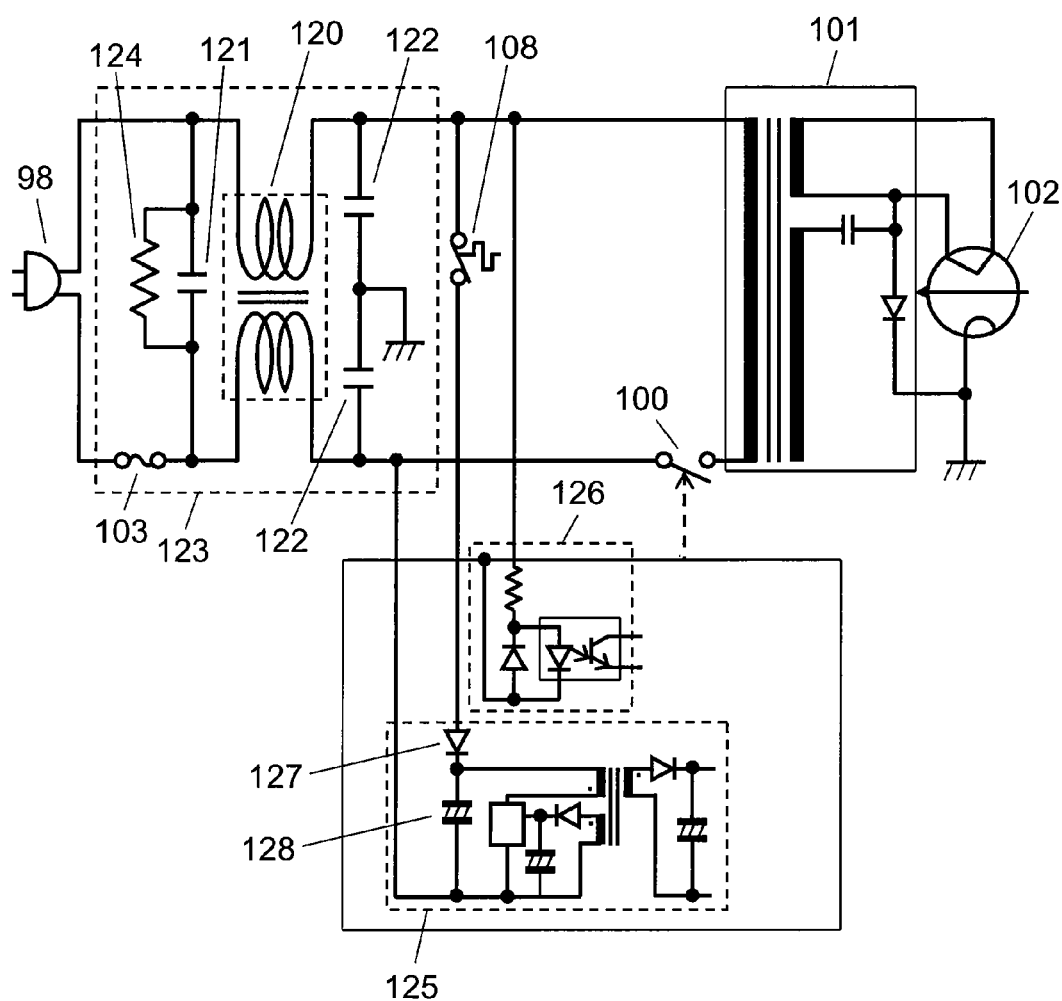
FIG. 5 is a circuit diagram of another conventional radio frequency heating apparatus.

The operation of the radio frequency heating apparatus as configured above is described below with reference to a circuit diagram of the radio frequency heating apparatus in the exemplary embodiment in FIG. 3. In FIG. 3, the commercial power supply is supplied to magnetron 15, which is the radio frequency generator for heating food, via power plug 22 and printed circuit board 1 on which power-supply noise filter circuit 20 and power-supply synchronization detecting circuit 21 are mounted on the same board; and also via relay 13 and high-voltage transformer 14 that controls power. Magnetron 15 generates radio frequency to heating chamber 24 where cooking target 23 will be placed.

Tab terminal 8, which is an output side of printed circuit board 1, is connected to switching power-supply circuit 18 installed in control circuit 17 via temperature switch 16. This allows power to be supplied to control circuit 17 via temperature switch 16. Power-supply synchronization detecting circuit 21 on printed circuit board 1 is connected to control circuit 17 via tab terminal 12. In other words, an output signal of power-supply synchronization detecting circuit 21 is supplied to control circuit 17, typically using lead, via tab terminal 12. Microcomputer 25 configuring control circuit 17 controls time measurement of the radio frequency heating apparatus and input phase typically of relay 13 based on information on power-supply phase and commercial frequency obtained from power-supply synchronization detecting circuit 24.

Temperature switch 16 is provided for detecting abnormal heat generation from an electric component in the radio frequency heating apparatus, and stopping its operation. For example, temperature switch 16 is attached to high-voltage transformer 14 for enabling detection of layer short in high-voltage transformer 14 in advance. In the case of a circuit configuration in this exemplary embodiment, a discharge path of across-the-line capacitor 3 is secured, regardless of the operation of temperature switch 16, even if this temperature switch 16 is activated. In other words, power-supply synchronization detecting circuit 21 is used as the discharge path for charge accumulated at both ends of capacitor 3 configuring power-supply noise filter circuit 20 in this exemplary embodiment. The charge accumulated at both ends of across-the-line capacitor 3 is discharged via resistor 9, photo coupler 10, and diode 11 protecting photo coupler 10 that configure power-supply synchronization detecting circuit 21. As described above, in this exemplary embodiment, the charge is immediately discharged via power-supply synchronization detecting circuit 21 even if power plug 22 is pulled out. Accordingly, the risk of electric shock at the time of servicing can be reduced although a service person has a chance of touching printed circuit board 1.

As described above, since charge of across-the-line capacitor 3 is discharged using power-supply synchronization detecting circuit 21 in this exemplary embodiment, a dedicated discharge resistor that has conventionally been provided becomes unnecessary. In other words, the number of components can be reduced, and thus unnecessary cost can be cut back. In addition, by configuring power-supply noise filter circuit 20 and power-supply synchronization detecting circuit 21 on the same printed circuit board 1, the discharge path of across-the-line capacitor 3 can be secured regardless of the operation of temperature switch 16 or conventional temperature fuse 106. This also ensures safety.

Furthermore, in this exemplary embodiment, the size of printed circuit board 1 on which power-supply noise filter circuit 20 is mounted can be kept small without much expansion because a space-saving configuration is achieved by just adding diode 11, photo coupler 10, and a connecting part of signal line. Accordingly, the feasibility of sharing the conventional power-supply noise filter circuit is increased on installing printed circuit board 1 to a main body. This enables standardization of design. A parallel-connected body in which light-emitting element 10a of photo coupler 10 and diode 11 are connected in parallel in reverse directions is connected in series to resistor 9. Therefore, its effect becomes same as that of the conventional discharge resistor. Accordingly, there is almost no influence on performance of the conventional power-supply noise filter. In this exemplary embodiment, photo coupler 10 insulates electrical connection to control circuit 17. Accordingly, there is almost no influence of noise from the side of control circuit 17.

In the exemplary embodiment, charge accumulated at both ends of across-the-line capacitor 3 is discharged via power-supply synchronization detecting circuit 21. Even if a capacitor different from across-the-line capacitor 3 is connected, the same effect is achievable if charge accumulated at both ends of that capacitor is discharged via power-supply synchronization detecting circuit 21.

As described above, the present invention includes the heating chamber for placing the cooking target, the radio frequency generator for generating radio frequency in the heating chamber, the power-supply noise filter circuit for reducing power-supply noise generated by the radio frequency generator, the power-supply synchronization detecting circuit connected across both terminals of power supply for detecting information on power-supply frequency, and the printed circuit board on which the power-supply noise filter circuit and the power-supply synchronization detecting circuit are placed. The present invention uses the power-supply synchronization detecting circuit as the discharge path for charge accumulated at both ends of the capacitor configuring the noise filter circuit.

This configuration allows the power-supply synchronization detecting circuit to discharge charge accumulated at both ends of the capacitor configuring the noise filter circuit. Accordingly, a discharge resistor exclusively provided for discharge becomes unnecessary. In other words, the number of components can be reduced, and thus unnecessary cost can be cut back. Still more, mounting of the power-supply noise filter circuit and the power-supply synchronization detecting circuit on the same board secures the discharge path of capacitor, regardless of detachment or disconnection of internal wiring and the operation of the temperature switch or temperature fuse. Accordingly, the present invention also ensures safety.

Still more, the power-supply synchronization detecting circuit of the present invention includes the resistor, the photo coupler, and the diode for protecting the photo coupler.

With this configuration, the power-supply synchronization detecting circuit can be configured just by adding the diode, photo coupler, and the connecting part of signal line. This saves space. Accordingly, the size of printed circuit board where the conventional power-supply noise filter circuit is mounted does not have to be expanded so much. The possibility of sharing the conventional configuration of printed circuit board increases on installing the printed circuit board to the main body. Design can thus be standardized.

Furthermore, the power-supply synchronization detecting circuit includes a parallel-connected body having the light-emitting element of the photo coupler and the diode are connected in parallel in reverse directions and the resistor connected in series to the parallel-connected body.

This configuration achieves an effect as a discharge circuit same as that of the conventional resistor because the parallel-connected body in which the light-emitting element of the photo coupler and the diode are connected in parallel in reverse directions is connected in series to the resistor. Accordingly, there is almost no influence on performance of the conventional power-supply noise filter. In the exemplary embodiment, the photo coupler insulates electrical connection to the control circuit. Accordingly, there is almost no influence of noise from the side of control circuit.

INDUSTRIAL APPLICABILITY

The present invention eliminates the risk of electric shock typically at the time of servicing, reduces the number of components, and reduces standby power consumption in daily use. Accordingly, the present invention is effectively applicable to radio frequency heating apparatuses.

REFERENCE MARKS IN THE DRAWINGS

1 Printed circuit board
2 Common-mode choke coil
3 Across-the-line capacitor
4 Line-to-ground capacitor
5 Current fuse
6 Fuse holder clip
7, 8, 12 Tab terminal
9 Resistor
10 Photo coupler
10a Light-emitting element
11 Diode
17 Control circuit
20 Power-supply noise filter circuit
21 Power-supply synchronization detecting circuit
22 Power plug
23 Cooking target
24 Heating chamber
25 Microcomputer

The invention claimed is:

1. A radio frequency heating apparatus comprising:
a heating chamber that accommodates a cooking target;
a radio frequency generator that generates radio frequency in the heating chamber;
a power-supply noise filter circuit connected between two power supply terminals of a power supply, the noise filter circuit configured to reduce power-supply noise generated by the radio frequency generator, the noise filter circuit including a capacitor connected across the two power supply terminals;
a power-supply synchronization detecting circuit connected across the two power supply terminals, wherein the detecting circuit detects information on a power-supply frequency; and
a printed circuit board on which the power-supply noise filter circuit and the power-supply synchronization detecting circuit are mounted;
wherein the power-supply synchronization detecting circuit resides between the capacitor and the two power supply terminals, such that the detecting circuit provides a discharge path for charge accumulated at the power supply connection terminals of the capacitor.

2. The radio frequency heating apparatus of claim 1, wherein the power-supply synchronization detecting circuit includes a resistor, a photo coupler, and a protection diode that protects the photo coupler.

3. The radio frequency heating apparatus of claim 2, wherein the photo coupler comprises a light-emitting diode and the power-supply synchronization detecting circuit comprises:
a parallel-connected body including the light-emitting diode and the protection diode connected in parallel and in reverse directions with respect to each other, and the resistor,
wherein the resistor is connected in series with the parallel-connected body.

* * * * *